United States Patent
Crowell et al.

(10) Patent No.: US 9,735,984 B2
(45) Date of Patent: *Aug. 15, 2017

(54) BURSTING CLOUD RESOURCES TO AFFECT STATE CHANGE PERFORMANCE

(71) Applicant: International Business Machines Corporation, Armonk, NY (US)

(72) Inventors: Susan F. Crowell, Rochester, MN (US); Jason A. Nikolai, Rochester, MN (US); Andrew T. Thorstensen, Morrisville, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 416 days.

This patent is subject to a terminal disclaimer.

(21) Appl. No.: 14/480,964

(22) Filed: Sep. 9, 2014

(65) Prior Publication Data

US 2015/0334040 A1 Nov. 19, 2015

Related U.S. Application Data

(63) Continuation of application No. 14/275,988, filed on May 13, 2014.

(51) Int. Cl.
*G06F 9/455* (2006.01)
*H04L 12/64* (2006.01)
*H04L 12/911* (2013.01)

(52) U.S. Cl.
CPC ...... *H04L 12/6418* (2013.01); *G06F 9/45558* (2013.01); *H04L 47/70* (2013.01);
(Continued)

(58) Field of Classification Search
CPC .............................. H04L 47/70; G06F 9/45558
(Continued)

(56) References Cited

U.S. PATENT DOCUMENTS

| | | |
|---|---|---|
| 8,484,355 B1 | 7/2013 | Lochhead et al. |
| 9,417,902 B1 | 8/2016 | Noonan |

(Continued)

FOREIGN PATENT DOCUMENTS

| | | |
|---|---|---|
| WO | 2011088224 A3 | 10/2011 |
| WO | 2012172386 A1 | 12/2012 |
| WO | 2013126638 A1 | 8/2013 |

OTHER PUBLICATIONS

Tai, Jianzhe, et al; "ArA: Adaptive resource allocation for cloud computing environments under bursty workloads." In Performance Computing and Communications Conference (IPCCC), 2011 IEEE 30th International, pp. 1-8. IEEE, 2011.

(Continued)

*Primary Examiner* — Suraj Joshi
(74) *Attorney, Agent, or Firm* — Patterson + Sheridan, LLP

(57) ABSTRACT

Method to perform an operation, by, responsive to a request specifying to transition a state of a virtual machine in a cloud computing environment from a first state to a second state, allocating one or more system resources to the virtual machine during the transition from the first state to the second state, and, upon completion of the transition, releasing a portion of the allocated one or more system resources to a pool of available resources, so that the virtual machine is left with a remaining portion of the allocated one or more resources sufficient for operation during the second state.

7 Claims, 7 Drawing Sheets

(52) U.S. Cl.
CPC .............. *G06F 2009/4557* (2013.01); *G06F 2009/45595* (2013.01)

(58) Field of Classification Search
USPC ........................................................ 709/226
See application file for complete search history.

(56) References Cited

U.S. PATENT DOCUMENTS

| | | |
|---|---|---|
| 2011/0145392 A1 | 6/2011 | Dawson et al. |
| 2012/0222041 A1* | 8/2012 | Sabin .................. H04L 67/1008 718/105 |
| 2012/0254433 A1 | 10/2012 | Gujral et al. |
| 2013/0061220 A1 | 3/2013 | Gnanasambandam et al. |
| 2013/0268799 A1 | 10/2013 | Mestery et al. |
| 2013/0268861 A1 | 10/2013 | Bailey et al. |
| 2013/0305245 A1* | 11/2013 | Doddavula ............... G06F 9/50 718/1 |
| 2014/0137104 A1 | 5/2014 | Nelson et al. |

OTHER PUBLICATIONS

Liu, Changbin, et al; "Cloud Resource Orchestration: A Data-Centric Approach", 5th Biennial Conference on Innovative Data Systems Research (CIDR'11) Jan. 9-12, 2011, Asilomar, California, USA.

U.S. Appl. No. 14/275,988, entitled "Bursting Cloud Resources to Affect State Change Performance", filed May 13, 2014.

"List of IBM Patents or Patent Applications Treated as Related".

Tai et al, "ArA: Adaptive Resource Allocation for Cloud Computing Environments Under Bursty Workloads," In Performance Computing and Communications Conference (IPCCC), 2011IEEE3oth International, pp. 1-14.

Changbin Liu et al, "Cloud Resource Orchestration: A Data-Centric Approach," 5th Biennial Conference on Innovative Data Systems Research (CIDR'11), Jan. 9-12, 2011; Asilomar, California, USA.

Alsaiari, Najat O. et al. "Enhance Performance of Web Proxy Cache Cluster Using Cloud Computing", Advances in Science and Technology Research Journal, vol. 7, No. 20, Dec. 2013, pp. 1-10.

\* cited by examiner

| Virtual Machine | CPU | Memory | Storage | Network | State |
|---|---|---|---|---|---|
| 1000 | 2 cores | 8 GB | 2 GB SSD | 10 GB | Deployment |
| 1000 | 1 core | 1 GB | 2 GB SSD | 25 GB | Migration |
| 1000 | 2 cores | 2 GB | 1 GB SSD | 10 GB | Shut Down |
| 1001 | 2 cores | 8 GB | 100 GB SSD, high priority | 10 GB, high priority | Activation |
| 1001 | 1 core | 1 GB | 1 TB network, standard priority | 1 GB, standard priority | Execution |
| 1002 | 1 core | 4 GB | 1 TB SSD, high priority | 10 GB, high priority | Migration |
| Wildcard | 1 core | 2 GB | 1 GB SSD, high priority | 1 GB, high priority | Removal |
| Wildcard | 1 core | 1 GB | 1 GB SSD, high priority | 10 GB, high priority | Migration |

FIG. 4

BURSTING CLOUD RESOURCES TO AFFECT STATE CHANGE PERFORMANCE

CROSS-REFERENCE TO RELATED APPLICATION

This application is a continuation of co-pending U.S. patent application Ser. No. 14/275,988, filed May 13, 2014. The aforementioned related patent application is herein incorporated by reference in its entirety.

BACKGROUND

The present disclosure relates to cloud computing, and more specifically, to bursting cloud resources to improve state change performance.

Performance during certain state changes within a large dynamic cloud infrastructure as a service environment has been known to cause bottlenecks during deployment of virtual machines. The time to change states (for example, from powered off to active) can sometimes take several minutes. In many cases, the delay may be caused by insufficient system resources to change the state of the virtual machine.

SUMMARY

Embodiments disclosed herein provide at least a system, method, and computer program product to perform an operation, by, responsive to a request specifying to transition a state of a virtual machine in a cloud computing environment from a first state to a second state, allocating one or more system resources to the virtual machine during the transition from the first state to the second state, and, upon completion of the transition, releasing a portion of the allocated one or more system resources to a pool of available resources, so that the virtual machine is left with a remaining portion of the allocated one or more resources sufficient for operation during the second state.

BRIEF DESCRIPTION OF THE SEVERAL VIEWS OF THE DRAWINGS

FIG. 4 illustrates a data structure storing system resource allocations for virtual machine states, according to one embodiment.

DETAILED DESCRIPTION

Embodiments disclosed herein improve system performance when changing states of virtual machines in a cloud computing environment. Specifically, embodiments disclosed herein may allocate additional resources to the state change and/or prioritize a quality class of data traffic (network or storage I/O) of the state change in order to ensure that the state change completes as quickly as possible. For example, when activating an inactive virtual machine, additional memory, CPU, disk space, and/or network connection bandwidth may be allocated. In addition (or alternatively), network traffic and/or disk I/O traffic for the state change may be given a higher priority class in order to improve the time necessary to activate the virtual machine. Once the state change is complete, the additional resources may be returned to a pool of available resources. If the virtual machine continues to execute after the state change, the virtual machine may operate using a standard, or baseline level of resources. Additionally, if network or storage I/O traffic of the state change operation were given additional priority, this priority may be removed while the virtual machine continues to execute.

Generally, embodiments disclosed herein may modify the allocation of any resource and modify the priority of any software defined system attribute. Furthermore, the disclosure applies equally to all types of cloud computing environments. Embodiments disclosed herein may provide data structures which allow system administrators to define, for each virtual machine (or different groups or classes thereof), different resource allocations and prioritizations that result in improved state change performance. Advantageously, embodiments disclosed herein may also programmatically monitor different state changes in the cloud computing environment in order to determine how particular system resource allocations and prioritizations affect state change performance. Over time, embodiments disclosed herein may refine the entries in the data structures in order to reflect the most recent trends in state change performance, allowing subsequent state changes to be performed under the most advantageous conditions.

Figure 1A:
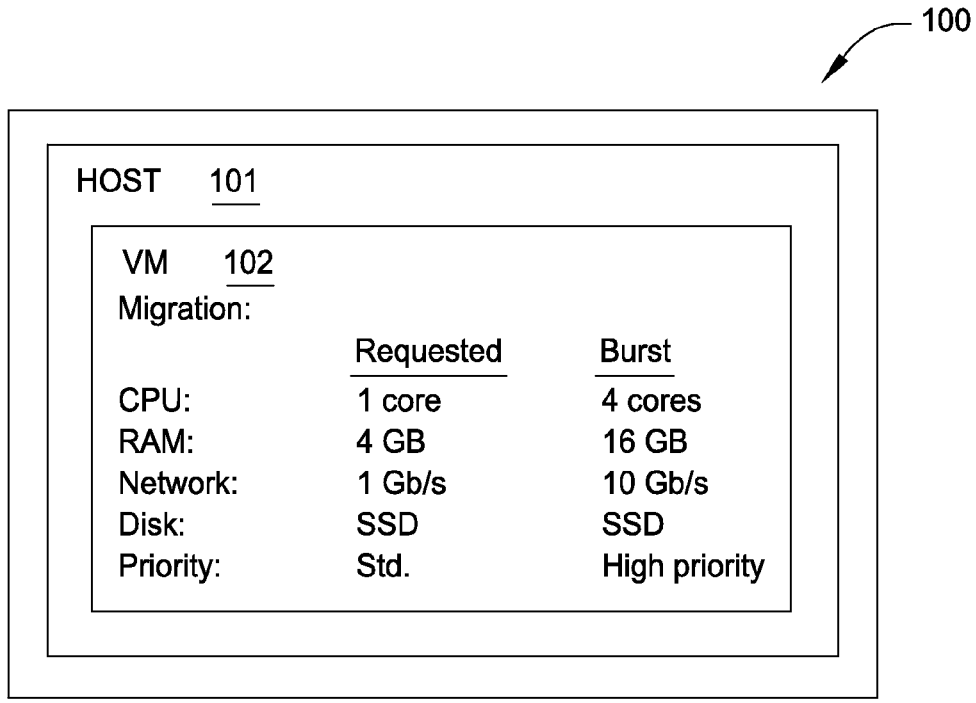
FIGS. 1A-1B illustrate techniques for bursting cloud resources to affect state change performance, according to one embodiment.

FIG. 1A illustrates techniques for bursting cloud resources to affect state change performance, according to one embodiment. As shown, a cloud computing environment 100 includes a virtual machine (VM) 102 executing on a physical host machine 101. The cloud computing environment 100 typically includes a plurality of host machines each executing one or more VMs. However, a single host 101 is shown executing a single VM 102 for the sake of clarity. In FIG. 1A, a hypervisor (not shown) or other component in the cloud computing environment 100 has received a request to migrate the VM 102 from the host 101 to a different host in the cloud computing environment 100. The request specifies an allocation of 1 CPU core, 4 GB of system memory, a 1 Gb/s network connection, a solid state storage device (SSD), and standard priority for storage I/O and network traffic.

However, in order to ensure the migration completes in as little time as possible, embodiments disclosed herein may provision additional system resources (for example, and without limitation, CPU, memory, storage capacity and/or speed, and network speed) for the migration. In addition or alternatively, the quality and speed of network and storage I/O may be increased in order to facilitate the state change. These additional resources and quality of service settings may be referred to as "burst" resource settings. If these burst settings exceed the requested settings, embodiments disclosed herein may allocate additional resources to improve completion times for the state change. Therefore, as shown, the cloud computing environment 100 may allocate two CPU cores, 16 GB of ram, a 10 Gb/s network connection, and an SSD for the migration. Furthermore, network and storage I/O may be given high priority in order to complete the data transfer as quickly as possible. Once the migration is complete, embodiments disclosed herein may remove some of the additional resources and/or priority.

Figure 1B:
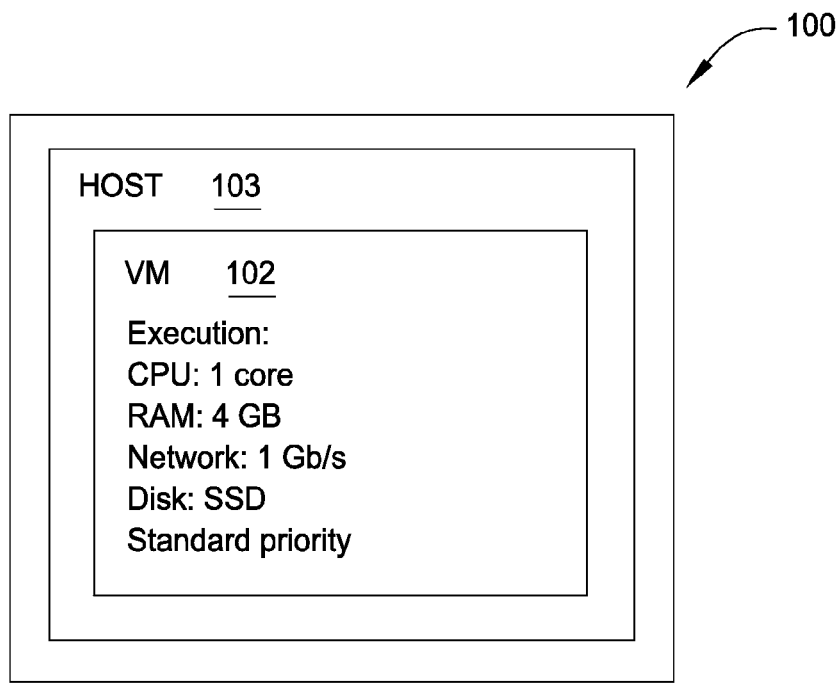

FIG. 1B illustrates the state of the cloud computing environment 100 after the VM 102 was successfully transferred to the host machine 103. As shown, the VM 102 continues to execute on host 103, but with different allocations relative to the resources allocated to the migration. As shown, the VM 102 executes with the requested resources, namely a single CPU core, four GB of ram, a one Gb/s network connection, an SSD drive, and standard priority for the network and storage I/O traffic. Because the high-priority state change event is complete, the additional resources may be returned to the cloud computing environment 100 for future allocation to other VMs and state changes. The specific values depicted in FIGS. 1A-1B are for illustrative purposes only, and should not be considered limiting of the disclosure, as the disclosure contemplates any combination of resource increases, decreases, and prioritization.

Figure 2:
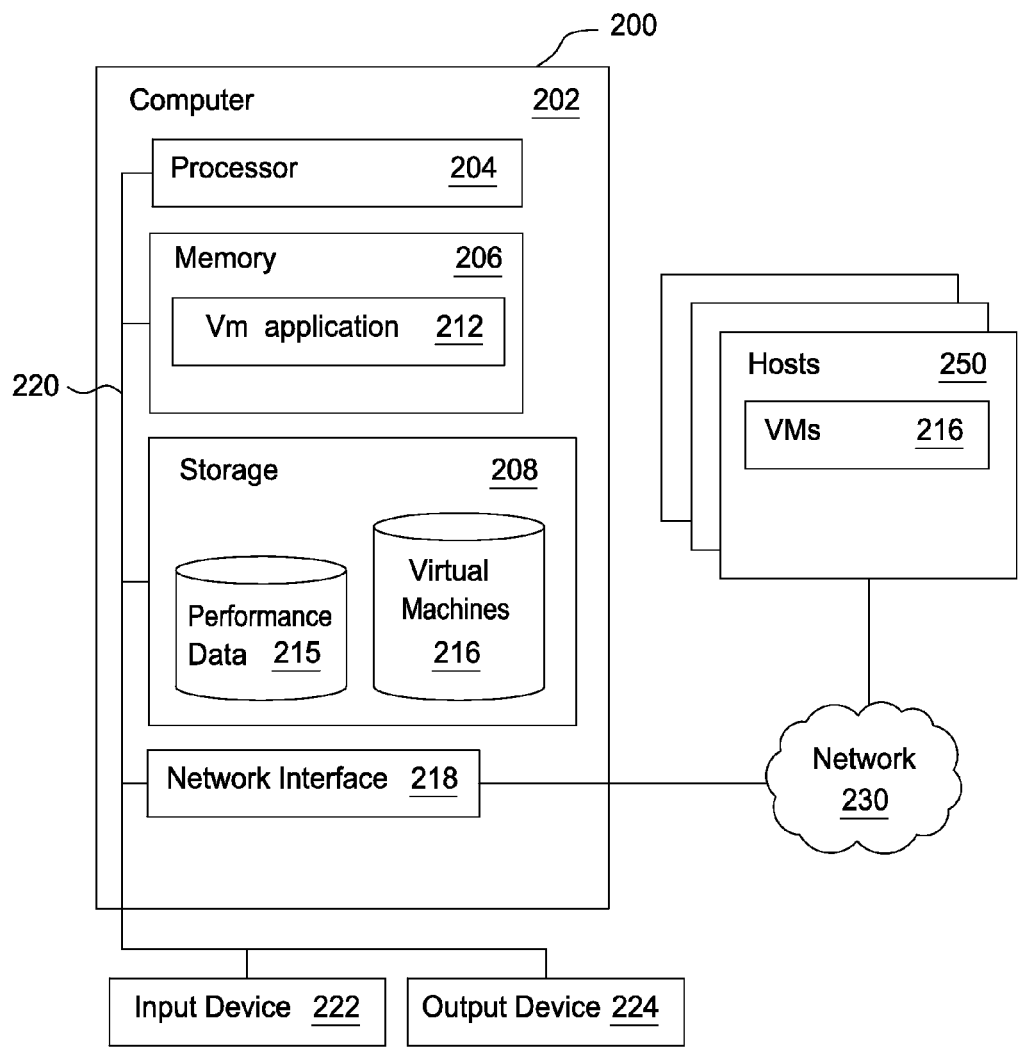
FIG. 2 illustrates a system to burst cloud resources to affect state change performance, according to one embodiment.

FIG. 2 illustrates a system 200 to burst cloud resources to affect state change performance, according to one embodiment. The networked system 200 includes a computer 202. In at least some embodiments, the networked system 200 is a cloud computing environment providing software services to one or more clients. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices. Furthermore, the storage 208 may reside locally or remotely relative to the computer 202.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains the VM application 212, which is an application generally configured to burst cloud resources to improve state change performance in the system 200. Generally, the VM application 212 may allocate additional resources to a state change of a virtual machine (VM) in the system 200 and/or assign different priorities for quality of service for data related to the state change. For example, when removing a VM 216 from a host machine 250, the VM application 212 may allocate additional CPU cores to the removal operation. Likewise, when activating a VM 216 on a host machine 250, the VM application 212 may provide additional network bandwidth (via a faster connection), as well as assigning higher priority to the activation operation, such that the quality of network service for the activation operation improves. In one embodiment, the VM application 212 (or the functionality thereof) is part of a cloud controller application (not shown) that communicates with hypervisors (not shown) executing on hosts 250 to manage host resources.

Furthermore, the VM application 212 may also identify particular hosts 250 that have additional resources available in order to facilitate the allocation of additional resource. For example, if the VM application 212 received a request to deploy a first VM 216 to a host, the VM application 212 may reference the performance data to identify the additional resources that should be allocated for the deployment operation. If the request does not specify a specific host 250, the VM application 212 may select one of the hosts 250 that has sufficient resources available to match the resources specified in the performance data 215. Therefore, if a first host has a 10 Mb/s network connection, and the performance data 215 specifies that 1 Gb/s should be allocated to deploying the first VM 216, the VM application 212 may identify a second host 150 that has a network connection that may provide the 1 Gb/s speeds.

The VM application 212 may further be configured to monitor state changes in the cloud computing environment 200 in order to define new rules in the performance data 215. The rules may include, without limitation, system resource allocations and quality of service levels that have been shown to improve state change operations. Therefore, if the VM application 212 observes a thousand deployments of the first VM 216, and those having the 1 Gb/s network connection complete (e.g., 50%) faster than those without, the VM application 212 may define a rule in the performance data 215 that deployments of the first VM should be performed using a 1 Gb/s network connection. Similarly, the VM application 212 may define rules for migration, startup, shutdown, removal, and any other state change operation for any virtual machine in the cloud computing environment 200. In at least some embodiments, the VM application 212 includes the functionality to create, deploy, execute, remove, and otherwise modify virtual machines.

As shown, the storage 208 includes the performance data 215 and the virtual machines 216. The performance data 215 generally includes system resource allocations and quality of service classes for different state change operations for one or more virtual machines. In some embodiments, hardware configurations and current resource utilization rates for each of the hosts 250 may be stored in the performance data 215. The performance data 215 may also include wildcard (or catchall) and/or baseline system resource configurations and quality of service settings for the virtual machines 216. The virtual machines 216 is configured to hold images for a plurality of virtual machines that may be deployed to hosts 250 in the cloud computing environment 200.

The hosts 250 are physical systems in the cloud computing environment configured to execute one or more virtual machines 216. The hosts 250 may communicate with the VM application 212 in order to provide updates on state change operation times, system resources, current utilization times, and the like. The hosts 250 may also include a CPU, memory, network interface, and local or remote storage (all not pictured).

Figure 3:
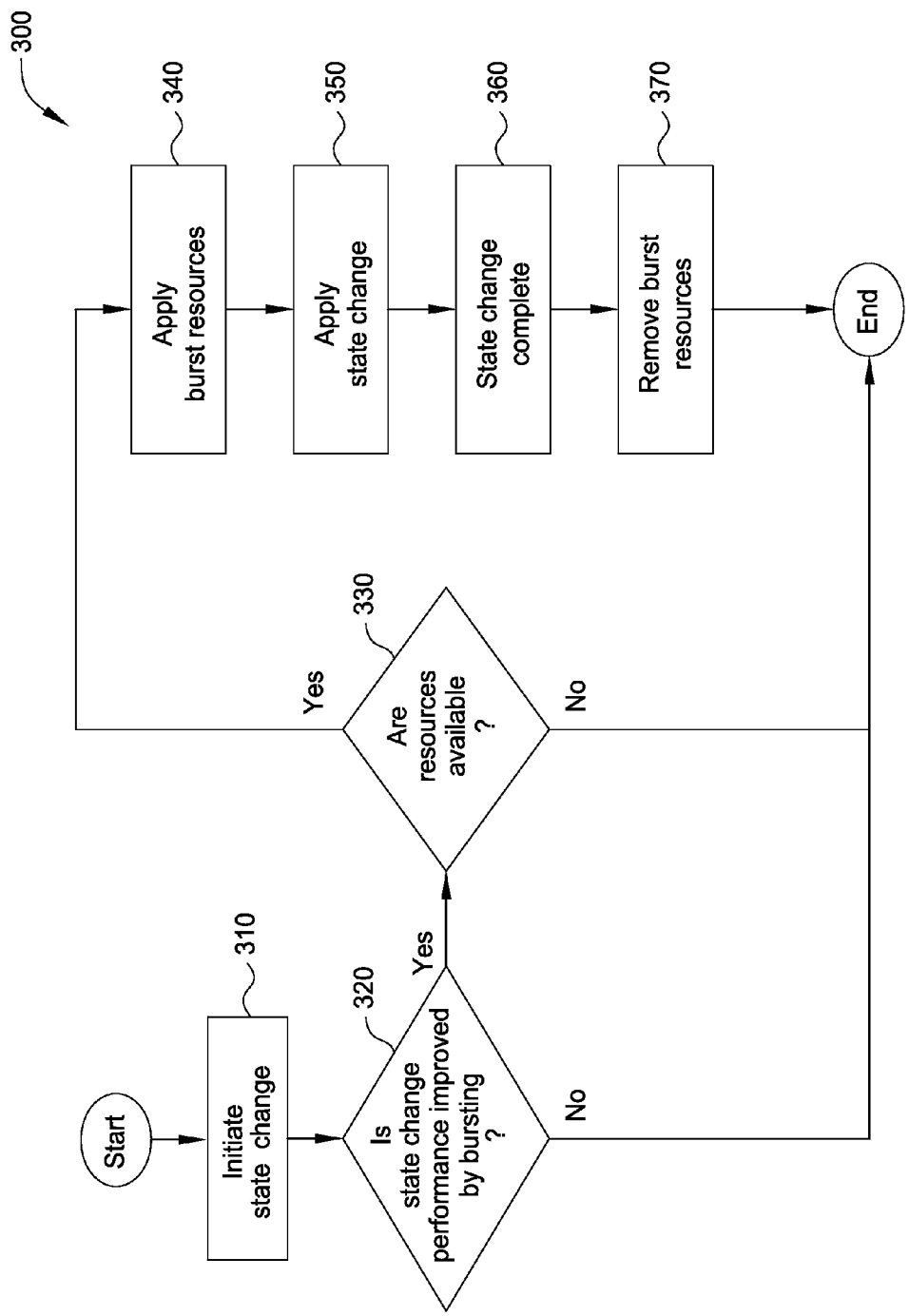
FIG. 3 illustrates a method to burst cloud resources to affect state change performance, according to one embodiment.

FIG. 3 illustrates a method 300 to burst cloud resources to affect state change performance, according to one embodiment. Generally, the steps of the method 300 allow for the provisioning of additional resources and/or increased quality of service for state changes to virtual machines in a cloud computing environment. In at least some embodiments, the VM application 212 performs the steps of the method 300.

At step 310, a user (or the VM application 212) initiates a state change. The state change may include, without limitation, deploying, starting, stopping, removing, or migrating a virtual machine in a cloud computing environment. The request may include requested system resource values and quality of service settings. For example, the user may request two CPU cores, 4 GB of memory, and a 100 Mb/s network connection. At step 320, the VM application 212 determines whether performance of the state change (in terms of the time to completion) will be improved by bursting resources. In some embodiments, the VM application 212 may reference the performance data 215 to determine whether an entry for the target VM has been defined. For example, a maximum value may be established per resource in the performance data 215 for the requested state change, such as 8 CPU cores, 16 GB of memory, and a 1 Gb/s network connection to deploy the requested virtual machine. The maximum values for each resource may be established by a user, or by the VM application 212. For example, the VM application 212, may monitor state change performance over time based on different resource allocations, and determine which configurations lead to the most effective and efficient state changes. In such a case, the specified values are greater than the values requested by the user at step 310. If the maximum values in the performance data 215 are greater than the requested values specified by the user, the VM application 212 may determine that state change performance may be improved. If, at step 320, the VM application 212 determines that state change performance may be improved by bursting resources, the VM application 212 proceeds to step 330. Otherwise, state change performance will likely not be improved, and the VM application 212 will not unnecessarily allocate additional resources to the state change operation, and allows the state change to complete normally.

In some embodiments, the VM application 212 may additionally determine whether the improvement exceeds a specified performance improvement threshold. For example, if the performance data 215 indicates that a migration using high priority for storage I/O traffic only results in a 5% faster migration, the VM application 212 may not allocate the additional resources if the performance improvement threshold is greater than 5%, such as 10%. The performance improvement threshold may generally specify a minimum performance gain, that if met for at least one state change, the VM application 212 may subsequently burst resources associated with the performance improvement in order to realize the performance gains on subsequent state changes. The VM application 212 may include a default performance improvement threshold. In addition, a user, such as an administrator, may set and/or modify the performance improvement threshold.

At step 330, the VM application 212 determines whether additional system resources defined in the performance data 215 are available. In one embodiment, the VM application 212 may communicate with hypervisors of the hosts 250 in order to determine whether sufficient resources exist. For example, if the "burst" settings in the performance data 215 specify 16 GB of memory, the VM application 212 may first determine whether a given host 250 has enough memory to allocate to the state change. In some embodiments, the VM application 212 may take advantage of "capacity on demand" platforms, where "dormant" resources are temporarily activated to meet the burst requirements under a discounted pricing model. If no resources are available, the VM application 212 takes no further action, and the state change proceeds as normal. If additional resources are available, the VM application 212 proceeds to step 340.

At step 340, the VM application 212 applies the additional resources that can improve performance of the state change, up to the limit defined in the performance data 215. In addition, the VM application 212 may also define different quality of service settings for data traffic of the state change operation. For example, network and/or storage I/O traffic for the state change operation may be given higher levels or classes of service. In some embodiments, the VM application 212 may automatically allocate the maximum resources defined in the performance data 215. In other embodiments, the VM application 212 may incrementally increase the allocated resources according to a predefined timing schedule. For example, if 16 GB of memory are specified as the maximum value for starting a deployed VM 216 on a host 250, the VM application 212 may allocate all 16 GB at step 340, or may start at a predefined value (such as 8 GB), and increase the allocation over time until the maximum 16 GB are allocated. Furthermore, if some, but not all, additional resources are available, the VM application 212 may allocate those available additional resources before the end of the state change. In addition, the VM application 212 may generally add additional resources during a state change that has already started (a mid-stream state change).

At step 350, a hypervisor on the host 250 may apply the requested state change. For example, the hypervisor may power on a virtual machine, migrate a virtual machine to a different host, shut down the virtual machine, etc. At step 360, the VM application 212 the state change is completed. An example of a completed state change is a complete booting of an operating system of the virtual machine 216 on the host 250. The hypervisor (or other components in the cloud, such as the VM application 212) may report that the state change is complete. At step 370, after the state change is complete, the VM application 212 may remove the additional resources allocated at step 340. Also, if the VM application 212 applied enhanced quality of service settings for the state change operation, the VM application 212 may remove the enhanced settings at step 370.

FIG. 4 illustrates a data structure 400 storing system resource allocations for virtual machine states, according to one embodiment. The particular format and values shown in the data structure 400 are for illustrative purposes only, and should not be considered limiting of the disclosure. Generally, the data structure 400 may take any form suitable to store maximum values for any types of system resources for different states of a plurality of virtual machines. In at least one embodiment, the data structure 400 may be stored in the performance data 215.

The data structure 400 includes values for CPU, memory, storage, network, and a state of the virtual machine. The values may be maximum values for each system resource. As shown, three different state changes have been defined for the virtual machine 100. Each state change includes specific resource allocations, such as 8 GB of memory for deployment, 1 GB for migration, and 2 GB for shutting down the virtual machine 1000. Furthermore, different qualities of service may be defined for any software service. Specifically, network and storage traffic may be given different classes of priority. Therefore, as shown, network and storage traffic of the virtual machine 1001 are given high priority, relative to the standard priority given while the virtual machine 1001 executes.

As shown, wildcard values may also be defined in the data structure 400 for any type of state. For example, migration generally takes significant amounts of time due to the time necessary to transfer the data from one host to another. Therefore, the migration wildcard entry has been defined to provide a 10 Gb/s connection to "wildcard" virtual machines. The wildcard virtual machines are those virtual machines that do not have a corresponding entry for the particular state already defined in the data structure 400. Generally, any types of entries may be added to the data structure 400.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
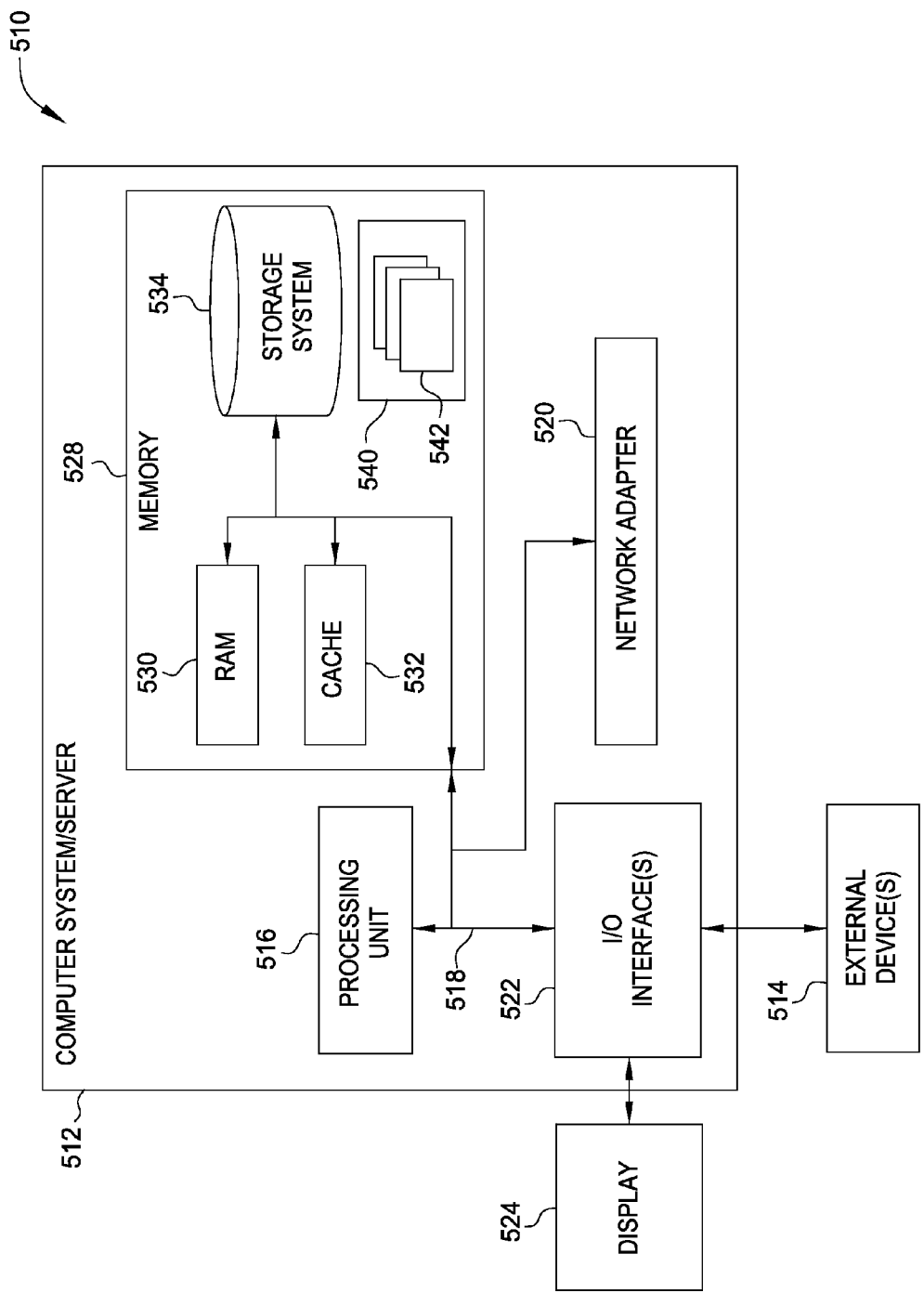
FIG. 5 depicts a cloud computing node according to one embodiment.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
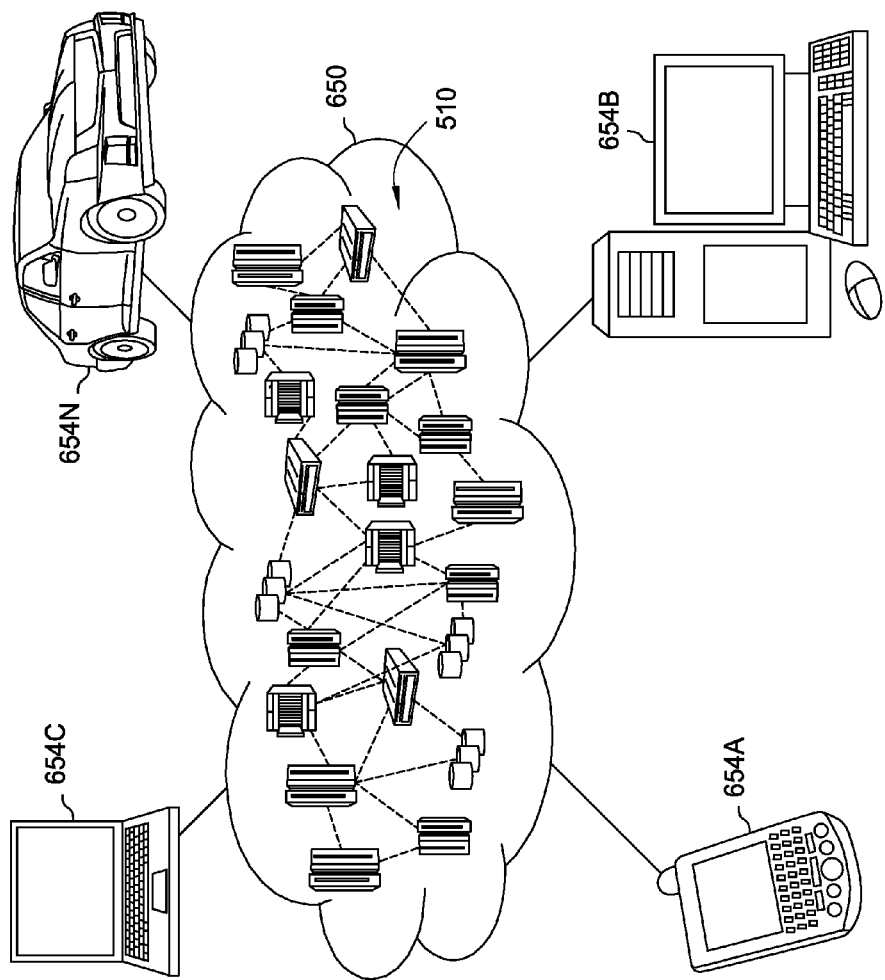
FIG. 6 depicts a cloud computing environment according to one embodiment.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
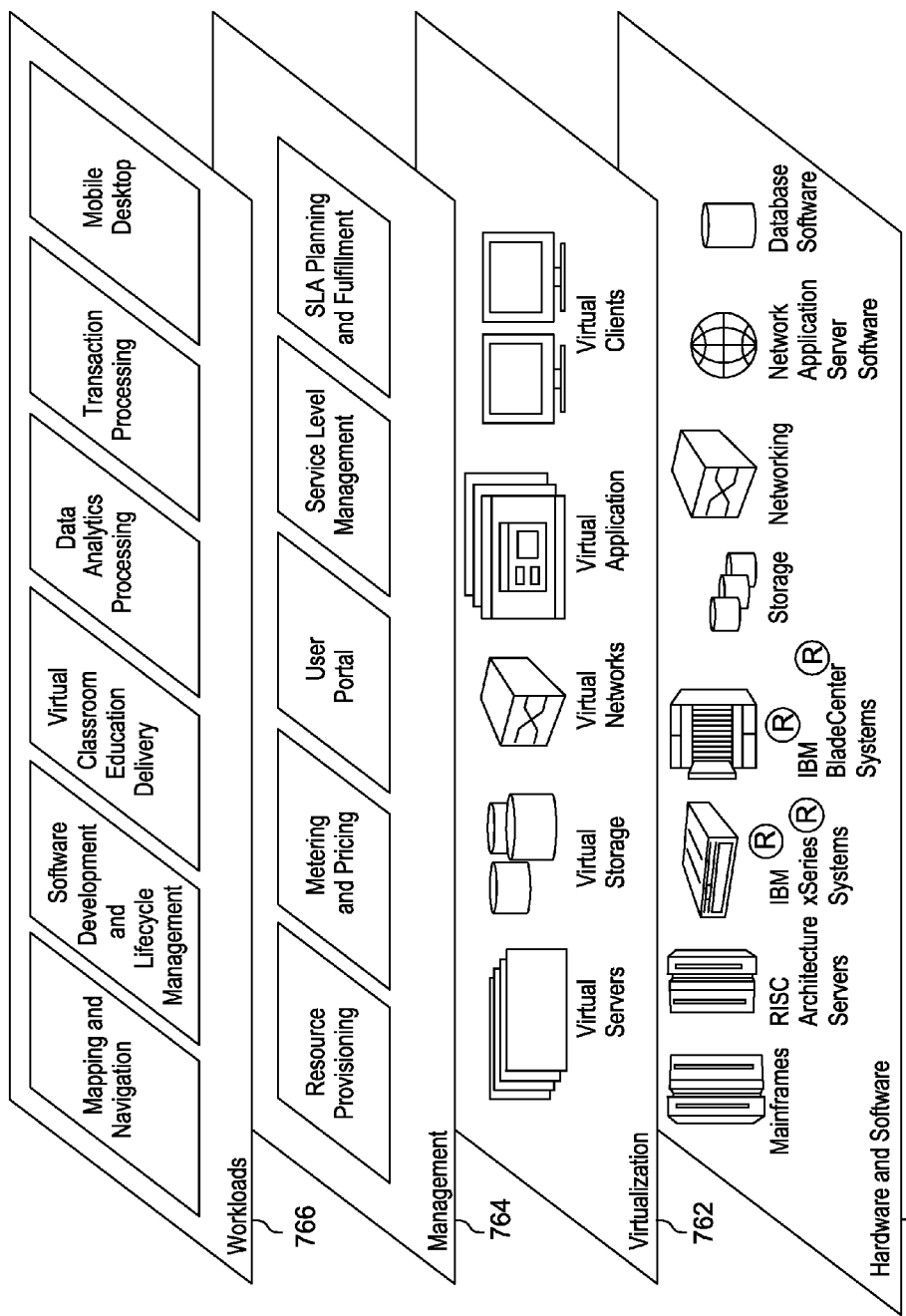
FIG. 7 depicts abstraction model layers according to one embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. For example, the VM application 212 could execute in the cloud and dynamically allocate resources during VM state changes and transitions. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Advantageously, embodiments disclosed herein allow for "bursting" of resources for state changes to virtual machines in a cloud computing environment. By allocating additional resources, as well as prioritizing network and/or storage I/O traffic for the state change, embodiments disclosed herein may improve the time it takes to complete the state change. Generally, embodiments disclosed herein may modify the allocation of any system resource, and modify the priority of any quality of service setting. Once the state change is complete, the system resources and quality of service settings may be returned to normal, i.e., to levels lower than the bursting levels, allowing the surplus resources (i.e., those additional resources required during bursting) to be returned to the pool of available resources. Therefore, embodiments disclosed herein provide faster state changes without requiring dedicated additional hardware that may otherwise go unused after the state change is complete and resource utilization levels return to normal.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
responsive to a request specifying to transition a state of a first instance of a virtual machine in a cloud computing environment from a first state to a second state:
allocating one or more system resources to the first instance of the virtual machine during the transition of the first instance of the virtual machine from the first state to the second state;
transitioning the first instance of the virtual machine from the first state to the second state; and
releasing a portion of the allocated one or more system resources to a pool of available resources, so that the first instance of the virtual machine is left with a remaining portion of the allocated one or more resources sufficient for operation during the second state.

2. The method of claim 1, wherein the transition comprises at least one of: (i) deploying, (ii) removing, (iii) activating, (iv) deactivating, and (v) migrating the first instance of the virtual machine in the cloud computing environment.

3. The method of claim 1, wherein the released portion of the allocated one or more system resources is pre-selected for allocation to the first instance of the virtual machine during the transition in order to expedite the transition relative to transitioning the first instance of the virtual machine from the first state to the second state using only the remaining portion of the allocated one or more resources.

4. The method of claim 1, wherein allocating one or more system resources to the first instance of the virtual machine comprises: (i) allocating additional amounts of the one or more system resources, and (ii) changing a quality of service of the one or more system resources.

5. The method of claim 1, further comprising:
prior to allocating the one or more system resources to the first instance of the virtual machine:
determining that allocating the one or more system resources reduces a time required to transition the state of the first instance of the virtual machine; and
determining that additional system resources are available for allocation.

6. The method of claim 1, wherein the at least one system resource comprises at least one of: (i) a CPU, (ii) a memory, (iii) a network connection attribute, and (iv) a storage I/O speed.

7. The method of claim 1, further comprising:
determining, for each of the one or more system resources, that allocating additional amounts of each system resource improves the time required to transition the state of the first instance of the virtual machine;
defining a rule specifying to allocate additional amounts of each system resource to improve the time required to change the state of the virtual machine;
receiving a request to transition the state of a second instance of the virtual machine from a first state to a second state;
allocating, based on the rule, additional amounts of each system resource to transition the second instance of the virtual machine from the first state to the second state;
transitioning the second instance of the virtual machine from the first state to the second state; and
releasing a portion of each system resource so that the second instance of the virtual machine is left with a remaining portion of each system resource sufficient for operation during the second state.

* * * * *